United States Patent
Zhou et al.

(10) Patent No.: US 9,883,156 B2
(45) Date of Patent: Jan. 30, 2018

(54) TECHNIQUES TO DISPLAY MULTIMEDIA DATA DURING OPERATING SYSTEM INITIALIZATION

(75) Inventors: Hua Zhou, Shanghai (CN); Qing Jian Song, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 1091 days.

(21) Appl. No.: 13/997,208

(22) PCT Filed: Nov. 30, 2011

(86) PCT No.: PCT/US2011/062508
§ 371 (c)(1),
(2), (4) Date: Jun. 22, 2013

(87) PCT Pub. No.: WO2013/081591
PCT Pub. Date: Jun. 6, 2013

(65) Prior Publication Data
US 2014/0363144 A1 Dec. 11, 2014

(51) Int. Cl.
*H04N 5/917* (2006.01)
*H04N 9/80* (2006.01)
*H04N 21/443* (2011.01)
*G06F 9/44* (2006.01)
*H04N 21/44* (2011.01)

(52) U.S. Cl.
CPC ............ *H04N 9/80* (2013.01); *G06F 9/4406* (2013.01); *H04N 21/44* (2013.01); *H04N 21/4432* (2013.01)

(58) Field of Classification Search
None
See application file for complete search history.

(56) References Cited

U.S. PATENT DOCUMENTS

| 5,966,182 A | 10/1999 | Yonemitsu et al. |
| 6,373,498 B1 * | 4/2002 | Abgrall ............... G06F 9/4406 345/619 |
| 6,791,572 B1 * | 9/2004 | Cloney ............... G06F 9/4401 345/619 |

(Continued)

FOREIGN PATENT DOCUMENTS

| CN | 101448149 | 6/2009 |
| CN | 101676870 | 3/2010 |

(Continued)

OTHER PUBLICATIONS

Extended European Search Report received for European Patent Application No. 11876481.0. dated May 11, 2015, 6 pages.

(Continued)

*Primary Examiner* — Heather Jones

(57) ABSTRACT

Techniques for displaying multimedia data during operating system initialization are described. In some embodiments, a method may comprise initializing a computing system, initializing a media playback system of the computing system using a first processor circuit and initializing an operating system of the computing system using a second processor circuit. In various embodiments, during the operating system initialization, one or more multimedia streams may be outputted using the media playback system. Other embodiments are described and claimed.

21 Claims, 8 Drawing Sheets

(56) References Cited

U.S. PATENT DOCUMENTS

| | | |
|---|---|---|
| 6,948,058 B2 | 9/2005 | Tung |
| 2002/0024616 A1 | 2/2002 | Kim |
| 2005/0168638 A1 | 8/2005 | Iwata |
| 2005/0244135 A1 | 11/2005 | Yahata et al. |
| 2006/0236081 A1 | 10/2006 | Hung et al. |
| 2008/0077491 A1 | 3/2008 | Robinson et al. |
| 2009/0113197 A1 | 4/2009 | Kochar et al. |
| 2009/0148131 A1 | 6/2009 | Akgul |
| 2010/0079472 A1* | 4/2010 | Shang .............. G06F 9/4401 345/545 |
| 2010/0141685 A1 | 6/2010 | Lee |

FOREIGN PATENT DOCUMENTS

| | | |
|---|---|---|
| CN | 101989206 | 3/2011 |
| CN | 102111663 | 6/2011 |
| CN | 102123319 | 7/2011 |
| JP | 2001292341 | 10/2001 |
| JP | 2011054072 | 3/2011 |
| KR | 1020100037012 A | 4/2010 |
| KR | 1020100135478 A | 12/2010 |

OTHER PUBLICATIONS

Office Action received for Japanese Patent Application No. 2014-544709, dated Jun. 16, 2015, 4 pages including 3 pages English translation.

International Search Report and Written Opinion, dated Jul. 25, 2012, Application No. PCT/US2011/062508, Filed Date: Nov. 30, 2011, pp. 9.

Decision to Grant received for Japanese Patent Application No. 2014-544709, dated Dec. 22, 2015, 1 page (untranslated).

Office Action received for Chinese Patent Application No. 201180075167.9, dated Jul. 22, 2016, 11 pages (untranslated).

* cited by examiner

TECHNIQUES TO DISPLAY MULTIMEDIA DATA DURING OPERATING SYSTEM INITIALIZATION

BACKGROUND

The performance of modern computing systems and consumer electronic devices has increased rapidly in recent years. One particular area in which performance has evolved is processing power. Additionally, multimedia output capabilities of modern computing system and consumer electronic devices have also evolved. Modern systems and devices are often capable of outputting rich, high definition entertainment and multimedia content. The increased capabilities of modern systems and devices have also caused user expectations to evolve. As processing power and output capabilities continue to increase, providing a meaningful multimedia entertainment experience at all possible times becomes an important design consideration. As a result, it is desirable for computing systems and consumer electronic devices, when possible, to optimize multimedia data output. Consequently, there exists a substantial need for techniques display multimedia data during operating system initialization.

DETAILED DESCRIPTION

Figure 1:
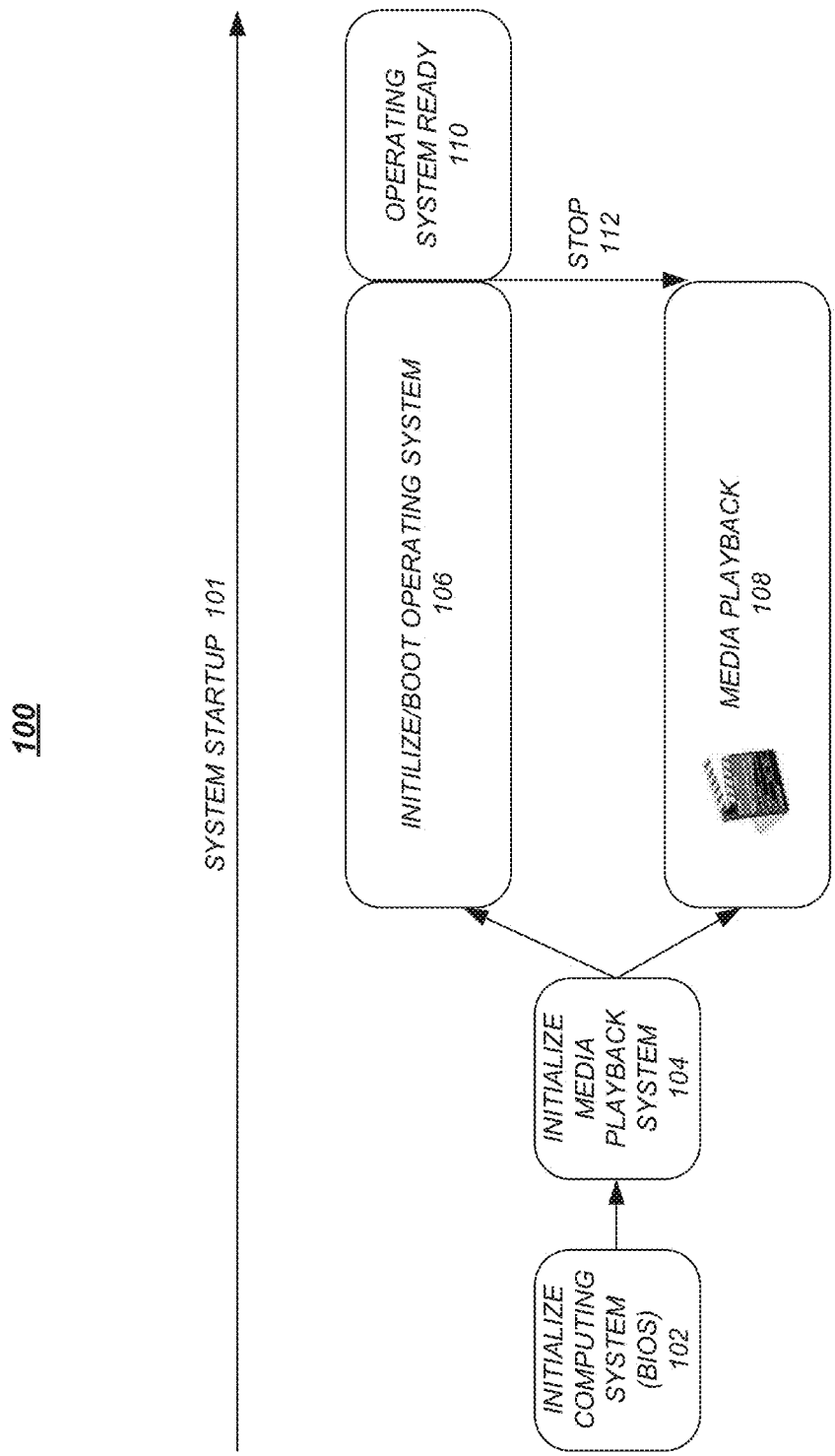
FIG. 1 illustrates one embodiments of a timing diagram.

The embodiments are generally directed to techniques designed to allow for the outputting of multimedia data during operating system initialization. Various embodiments provide techniques that include initializing a computing system, initializing a media playback system of the computing system using a first processor circuit, initializing an operating system of the computing system using a second processor circuit, and during the operating system initialization, outputting one or more multimedia streams using the media playback system. Other embodiments are described and claimed.

For computing and consumer electronic (CE) devices, like smart TVs, set-top boxes or Blu-ray disk players, it is a fundamental user experience requirement that the system display a still image during the system boot. However, as user expectations continue to increase along with system capabilities, simply displaying a still image, such as a logo, may not be sufficient use of the available computing power and may also not be sufficient to capture and maintain the attention of the user. In various embodiments, the user experience may be improved by including a simple animation during system boot, which has been done on some platforms. In some embodiments, however, this solution may increase the effort required on the part of the central processor (CPU) to load the animation from storage and perform any necessary decompression or other processing while simultaneously continuing to perform the system boot. Including audio with these types of animation under current solutions is nearly impossible without greatly and negatively effecting system boot time.

Various embodiments described herein provide for techniques that allow for the outputting of multimedia data during system boot. Instead of a long wait for the OS to boot, some embodiments may provide a system that allows for the presentation of a vivid short movie during the boot process and when the OS is ready for use, the movie playback may be interrupted and the system may switch back to the OS desktop. For example, various embodiments may exploit the hardware capability of the media processor that is present in many modern computing and CE devices to implement the media playback system. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiments of a timing diagram 100. Timing diagram 100 may illustrate, in some embodiments, how media playback 108 occurs in parallel with the initialization or booting of the operating system 106 during system startup 101. In various embodiments, initialization of a computer system following a power-on, reset or other restart activity (e.g. system startup 101) includes platform or computing system initialization 102, also referred to as basic input/output system (BIOS) booting, followed by initialization of an operating system (OS) 106, or OS booting. BIOS booting 102 may take approximately two to three seconds. In various embodiments, OS booting 106 may take significantly longer, and in some embodiments make take approximately ten, twenty, thirty seconds or more.

In some embodiments, depending upon services provided during BIOS booting 102, OS boot logic may draw relatively simple graphics on a display during OS booting 106. Since the graphics are associated with the OS logic, the graphics are typically associated with an OS vendor. As shown in timing diagram 100 and as described in more detail elsewhere herein, some embodiments may include a media playback system that is initialized 104 as part of system startup 101 to allow for media playback 108 to occur in parallel with OS booting 106. In various embodiments, media playback 108 may allow for the display of platform graphics during initialization of an OS 106 and, in some embodiments, display of platform graphics during BIOS booting, or a portion thereof. The embodiments are not limited in this context.

As shown in timing diagram 100, media playback 108 may be interrupted or otherwise stopped 112 when the OS is ready 110. At this point, in some embodiments, the OS may resume control over the computing device and normal system operations may proceed. In various embodiments, allowing for media playback 108 during the OS boot 106 may improve the user experience and expand the types and use of media that are presented during this otherwise limiting and sometimes frustrating wait time.

As used herein, the term, "platform graphics," refers to graphics other than OS initialization graphics generated by operating system initialization logic. In various embodiments, platform graphics may include one or more of audio, video, still pictures, text, wallpapers, and skins. The terms "platform graphics," "platform video," "multimedia data" and "multimedia streams" may be used interchangeably herein. In some embodiments, platform graphics may include, without limitation, graphics related to third party products or services, which may include advertising graphics, graphics provided by a computer platform vendor or manufacturer, graphics associated with an entity that owns or exercises control over a computer system, including a managed hosting provider, and personal graphics. Platform graphics may be displayed in place of OS initialization graphics in various embodiments. Alternatively, OS initialization graphics may be merged with platform graphics in some embodiments. In some embodiments, the platform graphics may comprise one or more high definition (HD) video streams and accompanying or corresponding audio streams. Other embodiments are described and claimed.

Figure 2A:
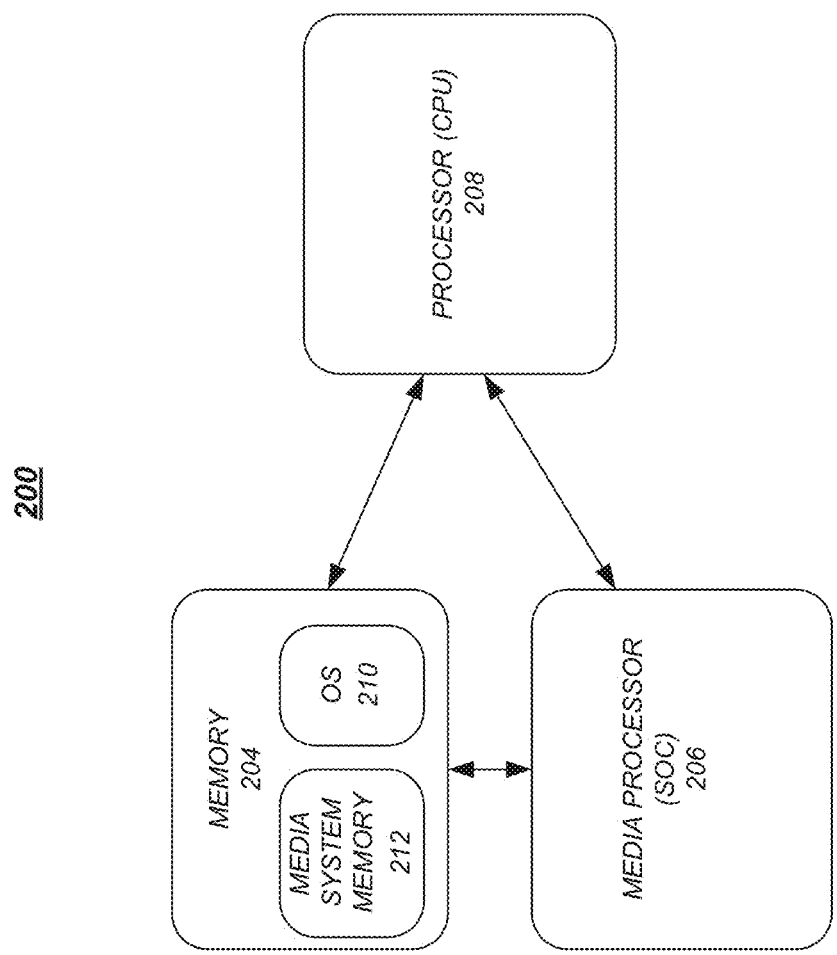
FIG. 2A illustrates one embodiment of a first apparatus.

FIG. 2A illustrates one embodiment of an apparatus. FIG. 2A illustrates a block diagram of an apparatus 200. Apparatus 200 may comprise a computing system or consumer electronics device in some embodiments and the terms may be used interchangeably hereinafter. As shown in FIG. 2A, apparatus 200 comprises multiple elements, such as memory 204, media processor 206, processor 208, operating system (OS) 210 and media system memory 212. The embodiments, however, are not limited to the elements or the configuration shown in this figure.

In various embodiments, processor 208 may comprise a central processing unit comprising one or more processor cores. The processor 208 may include any type of processing unit, such as, for example, CPU, multi-processing unit, a reduced instruction set computer (RISC), a processor that have a pipeline, a complex instruction set computer (CISC), digital signal processor (DSP), and so forth.

Memory 204 may comprise any suitable type of memory unit, memory device, memory article, memory medium, storage device, storage article, storage medium, register and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

In various embodiments, OS 210 may comprise a set of programs operative to manage manage computer hardware resources for computing device 200 and provide common services for application software. In some embodiments, OS 210 may be operative to act as an intermediary between application programs and the computing device 200 for hardware functions such as input and output and memory allocation. Examples of OS 210 may include but are not limited to Microsoft Windows®, Mac OS X®, iOS®, Linux® and Android®. Other embodiments are described and claimed.

Media system memory 212 may comprise a reserved portion of memory 204 in some embodiments. For example, media system memory 212 may comprise a portion of memory 204 that is reserved by BIOS that may remain untouched by OS 210. The embodiments are not limited in this respect.

Media processor 206 may comprise a microprocessor-based system-on-a-chip (SOC) device or circuit in various embodiments. In some embodiments, media processor 206 may be operative to process multimedia data or digital streaming data in real-time. For example, media processor 206 may be operative to process one or more of uncompressed digital video, compressed digital video (e.g. MPEG-1, MPEG-2, MPEG-4) or digital audio. In various embodiments, media processor 206 may comprise a microprocessor optimized to deal with any number of media data types, one or more memory interfaces, streaming media interfaces, and one or more specialized functional units operative to deal with the various digital media codecs as described in more detail with reference to FIG. 2B. The embodiments are not limited in this respect.

Media processors, such as media processor 206, are widely used in modern computing and consumer electronics device. For example, smart televisions, set-top boxes, high definition and Blue-ray media players and other devices often include a media processor 206. In some embodiments, the media processor 206 comprises a SOC device. Although the internal components of media processors 206 vary from between manufactures and devices, to some extent they share a common architecture. For example, many media processors include one or more media playback pipelines or media playback systems as described in more detail with reference to FIG. 2B.

In various embodiments, media processor 206 may be operative to initialize a media playback system. For example, media processor 206 may include one or more functional units that, together with media system memory 212, form a media playback system that is controlled by media processor 206. In some embodiments processor 208 may comprise a processor circuit that is operative to initialize an operating system 210. For example, processor 208 may comprise a CPU for computing device 200 that may be responsible for executing or running traditional applications under the control of OS 210. Other embodiments are described and claimed.

The media playback system, under the control of media processor 206, may be operative to output one or more multimedia streams during the initialization of OS 210 in some embodiments. For example, media processor 206 may be operative to output one or more high definition video and audio streams to a digital display (not shown) while processor 208 initializes OS 210 as shown in FIG. 1.

In various embodiments, processor 208 may be operative to determine that the OS 210 initialization is complete, send an interrupt to media processor 206 to stop the multimedia stream output, and output one or more graphical user interface elements of the OS 210. For example, processor 208 may interrupt the media playback system when OS 210 is initialized and ready for operation. In this manner, media playback system may be capable of reproducing multimedia data while the OS 210 is being initialized and, when ready, processor 208 and OS 210 can take control of computing device 210 to being normal computing operations. In some embodiments, in order to allow for the multimedia data to be played back while the OS 210 is booting, BIOS may be operative to report a fake frame buffer address in order to mask any intended OS 210 graphic output. Other embodiments are described and claimed.

In various embodiments, the media playback pipeline or media playback system of media processor 206 that enables this parallel playback of multimedia data and OS 210 initialization may be further described with reference to FIG. 2B.

Figure 2B:
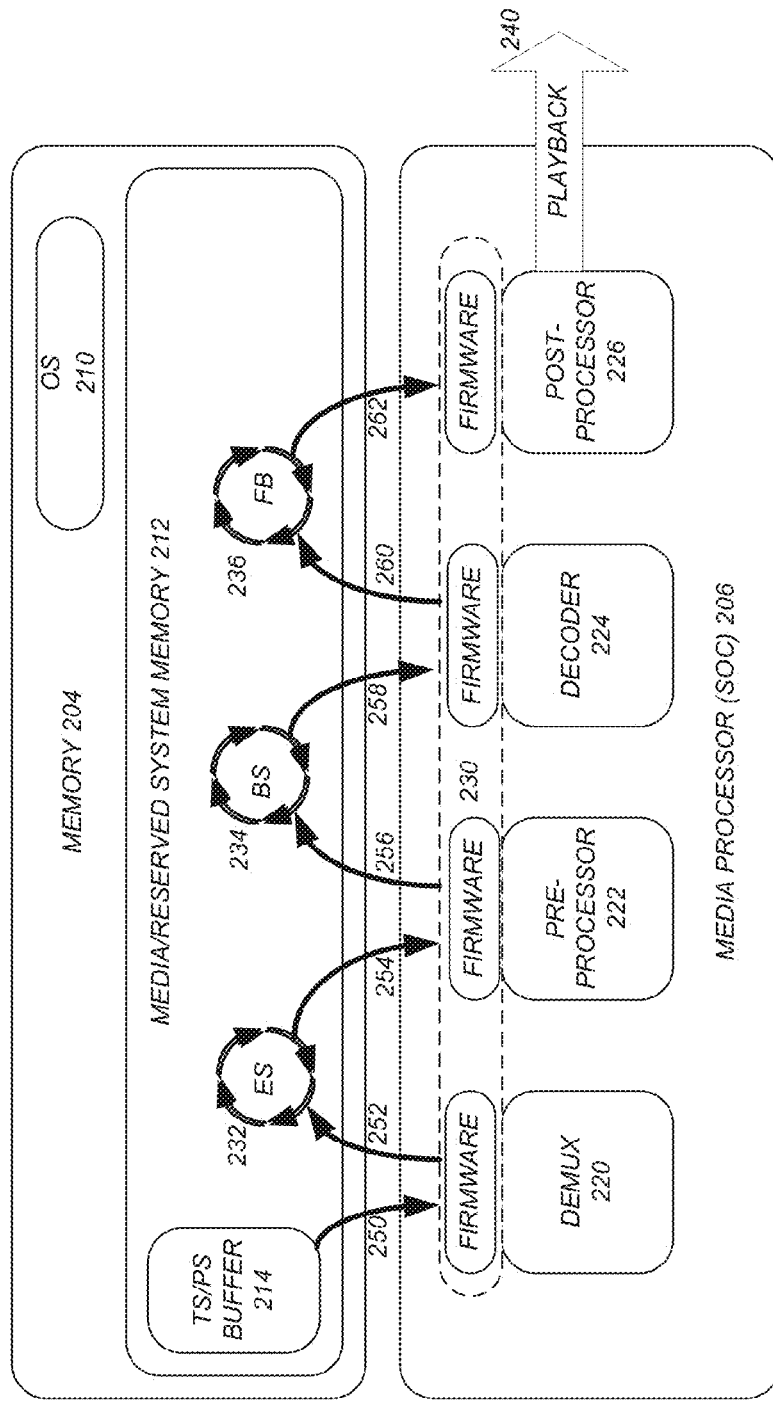
FIG. 2B illustrates one embodiment of a second apparatus.

FIG. 2B illustrates one embodiment of an apparatus. FIG. 2B illustrates a block diagram of an apparatus 250. Apparatus 250 may comprise a computing system or consumer electronics device in some embodiments and may be the same or similar to computing device 200 of FIG. 2A where like elements are similarly numbered. In various embodiments, apparatus 250 may comprise an exploded or expanded view of media processor 206 and media/reserved system memory 212. The embodiments are not limited to the number, type or arrangement of elements shown in this figure.

As shown in FIG. 2B, media processor 206 may include a plurality of functional blocks that together form a media playback pipeline or media playback system. For example, media processor 206 includes but is not limited to a demultiplexer 220, pre-processor 222, decoder 224 and post-processor 226. Each of these functional units additionally includes associated firmware 230 in some embodiments. In various embodiments, the plurality of hardware functional units 220-226 and the firmware 230 may be combined to form a self-managed pipeline that can run independently from OS 210.

In some embodiments, each node or functional unit 220-226 of the media playback system may consist of two parts: the firmware or microcode 230 and the hardware 220-226. Instead of using a pure hardware processing unit or a pure software processing unit, various embodiments described herein combine the hardware 220-226 and the firmware 230 to form a media playback system that is capable of more flexibility and stability than previous systems.

In various embodiments, demultiplexer logic 220 may be operative to receive a program stream (PS) 250 from a media source 214, extract video and audio streams from the program stream to form an elementary stream (ES) and send the elementary stream 252 to a first circular buffer 232 in a reserved portion of system memory 212. The media source 214 may comprise a local media source in memory 204, such as a transport stream or program stream buffer 214 as shown in FIG. 2B. In other embodiments, the media source may comprise an external media source or content provider, such as an external media player, cable or satellite provider or any other suitable media source as one skilled in the art would understand.

Pre-processor logic 222 may be operative to retrieve the elementary stream 254 from the first circular buffer 232, perform error correction on the elementary stream 232, and send a compressed bit stream (BS) 256 to a second circular buffer 234 in the reserved portion of system memory 212 based on the error correction in various embodiments. In some embodiments, decoder logic 224 may be operative to retrieve the compressed bit stream 258 from the second circular buffer 234, decode the compressed bit stream 234 using one or more decoding algorithms to generate one or more raw video and audio data streams (FB) 260, and send the one or more raw video and audio data streams 260 to a third circular buffer 236 in the reserved portion of system memory 212. In various embodiments, the real video and audio decoding task happens here at the decoder logic 224. For example, to meet a requirement of real-time HD playback, the decoder logic 224 may comprise dedicated silicon or a DSP that is highly optimized according to the different decoding algorithms that may be required by the system.

In some embodiments, post-processor logic 226 may be operative to retrieve the one or more raw video and audio data streams 262 from the third circular buffer 236, perform one or more of noise reduction, picture scaling or other suitable post-processing activity on the one or more raw video and audio data streams 262 to generate one or more multimedia streams 240, and output the one or more multimedia streams 240. For example, the one or more multimedia streams 240 may be outputted as playback on a digital display by the media system. In various embodiments, post-processor logic 226 may be operative to improve the quality of the decoded video and audio. For example noise reduction, scaling and other corrections may be performed by post-processor logic 226. Other embodiments are described and claimed.

In various embodiments, the functional units 220-226 of media processor 206 may form a number of consumer-producer relationships to form the media playback system. For example, in the self-managed pipeline, the output of first process unit 220 is connected to the input of following unit 222, the output of the second unit 222 is connected to the input of the third unit 224 and the output of the third unit 224 is connected to the input of the fourth unit 226 and so on. In this manner, the relationship between two adjacent functional units is actually a pair of producer and consumer units. By using this relationship, in various embodiments, a shared circular buffer (e.g. 232, 246 and 236 respectively) may be operative to resolve any access competition between two processing units. In various embodiments, the circular buffers 232, 234 and 236 may comprise any suitable circular buffer, cyclic buffer or ring buffer comprising a data structure that uses a single, fixed-size buffer as if it were connected end-to-end. In some embodiments, the structure of circular buffers 232, 234 and 236 may lend itself easily to buffering data streams as required in the described multimedia playback system.

Besides the original decoding function, extra blocks may be added into a firmware workflow 230 in some embodiments. For example, each processing unit 220-226 may be operative to actively fetch data from a circular buffer 232-234, 236 and feed the backward unit if there is output. While shown in FIG. 2B as being part of media processor 206, it should be understood that firmware 230 may be stored in memory 204, memory 212 or any other suitable location and still fall within the described embodiments. In some embodiments, firmware 230 may be dedicated for each functional unit 220-226. A workflow for firmware 230 is described in more detail with reference to FIG. 3.

Figure 3:
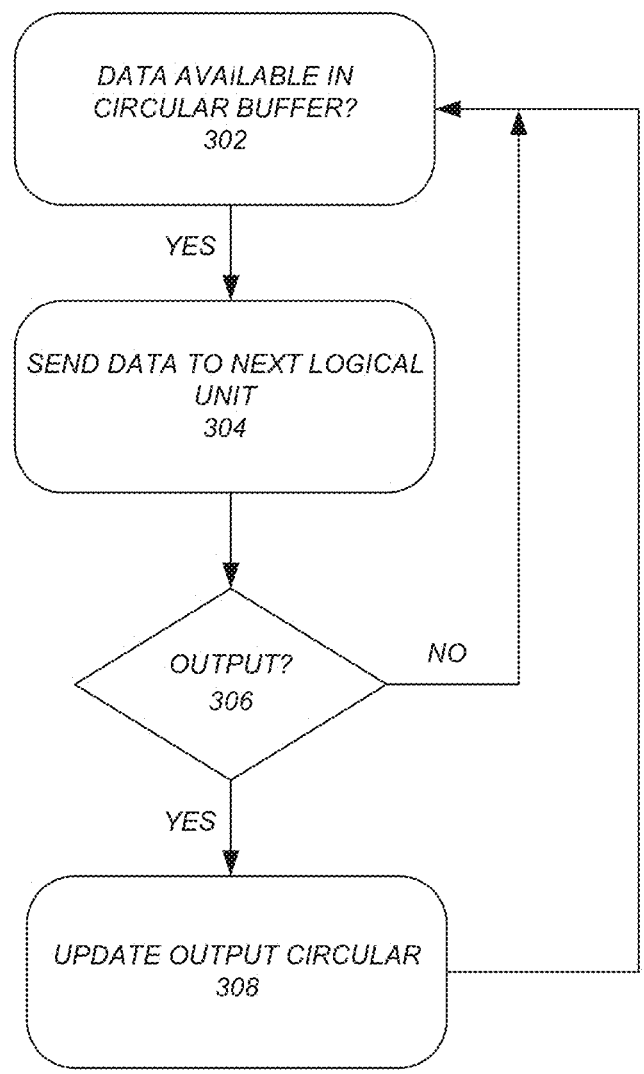
FIG. 3 illustrates one embodiment of a first logic diagram.

FIG. 3 illustrates one embodiment of a logic flow 300. In various embodiments, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor). In some embodiments, the logic or instructions may be embodied on a non-transitory computer-readable storage medium to be executed by a computer processor. The embodiments are not limited in this context.

Logic flow 300 may illustrate the workflow for firmware 230 of FIG. 2B in some embodiments. At 302, the firmware may determine if data is available in a circular buffer. For example, firmware 230 may be operative to determine if data is available in any of circular buffers 232, 234 and 236. At 304, in some embodiments, the firmware may send the data in the circular buffer to a next logical unit if data is available in the circular buffer. For example, if firmware 230 determines that data is available in circular buffer 234, the data may be sent to decoder 224.

In various embodiments, the firmware in one or more processing units may be operative to continually poll one or more corresponding circular buffers and once an input is available, it may send the data to dedicated hardware for further processing. In various embodiments, at 306 the firmware may determine if there is any output. For example, if there is data output, firmware 230 may be operative to update the output circular buffer at 308 thereby notifying the next functional unit in the media playback pipeline. In various embodiments, each processing or functional unit in the media playback system may include firmware in the pipeline that follows the same polling logic. Because the firmware is responsible for fetching data as its input, there is no requirement for control processor involvement and an automatically running pipeline may be built up in some embodiments.

In various embodiments, the media playback system described in FIGS. 1-3 may improve upon existing solutions for outputting multimedia data. For example, some prior solutions relied on a pure software method, which may present various problems including occupying significant CPU time segments and thereby prolonging OS boot time. In some embodiments, HD content may comprise big challenge for pure software decoders. For example, in the CE market, the control processor utilized in modern devices is generally not as powerful as PC's processor, making decoding HD video by software nearly impossible, and adding HD audio at the same time even more challenging.

The above-described embodiments may improve upon these prior software systems by working separately and in parallel outside of the OS. In various embodiments, the above-described embodiments do not consume additional CPU time or power because the media system is implemented as a separate system. Therefore, media playback capabilities are improved and system/OS boot time is not affected. Other embodiments are described and claimed.

Figure 4:
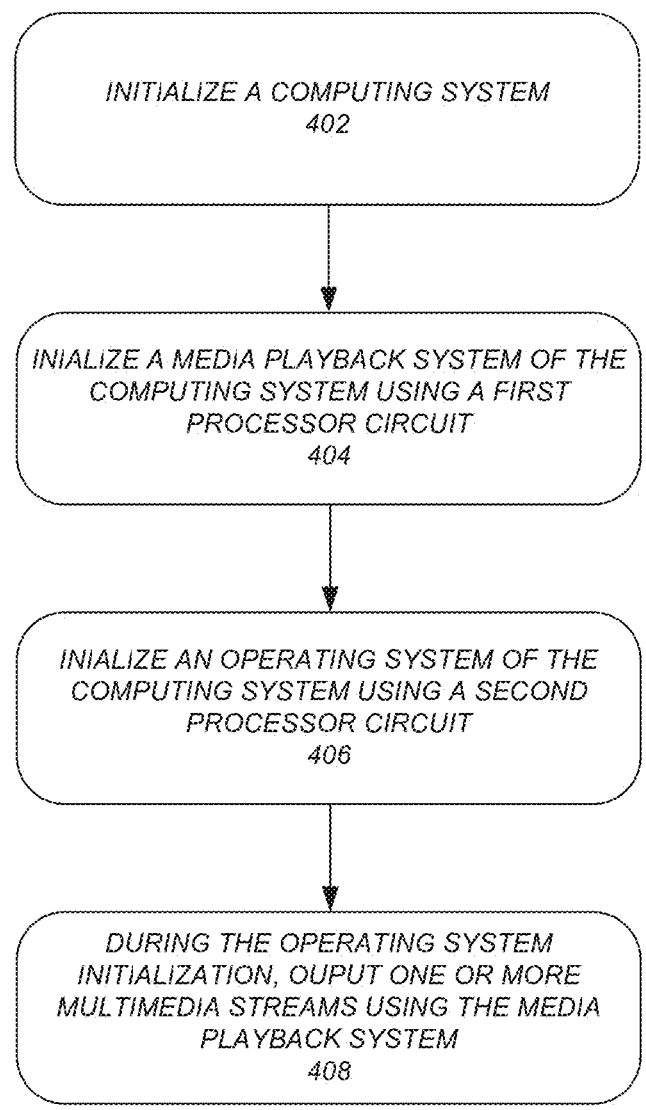
FIG. 4 illustrates one embodiment of a second logic diagram.

FIG. 4 illustrates one embodiment of a logic flow 400. In various embodiments, the logic flow 400 may be performed by various systems and/or devices and may be implemented as hardware, software, firmware, and/or any combination thereof, as desired for a given set of design parameters or performance constraints. For example, one or more operations of the logic flow 400 may be implemented by executable programming or computer-readable instructions to be executed by a logic device (e.g., computer, processor). In some embodiments, the logic or instructions may be embodied on a non-transitory computer-readable storage medium to be executed by a computer processor. The embodiments are not limited in this context.

In various embodiments, a computing system may be initialized at 402. For example, the computing system described with reference to FIGS. 2A and 2B may be powered on, restarted or otherwise initiated or booted up. At 404, in some embodiments, a media playback system of the computing system may be initialized using a first processor circuit. For example, a media playback system for computing device 200 may be initialized using media processor circuit 206. In various embodiments, an operating system of the computing system may be initialized using a second processor circuit at 406. For example, OS 210 of computing device 200 may be initialized by processor circuit 208. In various embodiments, the first processor circuit may comprise a system-on-chip (SOC) media processor circuit and the second processor circuit may comprise a central processing unit (CPU).

At 408, in some embodiments, one or more multimedia streams may be output during the operating system initialization using the media playback system. For example, during the initialization of OS 210 by processor 208, media processor 206 may be operative to execute or control a media playback system that is capable of outputting one or more multimedia streams comprising high definition video and audio streams. As described with reference to FIG. 1, the outputting of the one or more multimedia streams may be implemented by a system that is separate and distinct from processor 208 such that the outputting occurs in parallel with the OS booting and does not negatively effect the OS boot time. Other embodiments are described and claimed.

In various embodiments, when it is determined that the operating system initialization is complete, the multimedia output may be interrupted using the second processor circuit and one or more graphical user interface elements of the operating system may be outputted using the second processor circuit. For example, in various embodiments processor 208 may be operative to determine that OS 210 is initialized and ready for use and may then interrupt or otherwise stop the media playback system 206 to allow for normal computing operations to proceed under control of processor 208 and OS 210.

The media playback system may include a plurality of functional units in some embodiments. For example, as described with reference to FIG. 2B, the media processor or media playback system 206 may include but is not limited to demultiplexer logic 220, pre-processor logic 222, decoder logic 224 and post-processor logic 226. In various embodiments, a program stream may be received at demultiplexer logic of the media playback system, video and audio streams may be extracted from the program stream to form an elementary stream and the elementary stream may be sent to a first circular buffer in a reserved portion of system memory. For example, demultiplexer logic 220 may be operative to receive a program or transport stream from TS/PS buffer 214, extract the video and audio streams to form and elementary stream, and send the elementary stream to circular buffer 232 in reserved system memory 212.

In some embodiments, the elementary stream may be retrieved from the first circular buffer by pre-processor logic of the media playback system, error correction may be performed on the elementary stream, and a compressed bit stream may be sent to a second circular buffer in the reserved portion of system memory based on the error correction. For example, pre-processor logic 222 may be operative to receive or retrieve the elementary stream from circular buffer 232, perform error correction on the stream to form a compressed bit stream, and send the compressed bit stream to circular buffer 232 of reserved system memory 212.

The compressed bit stream may be retrieved from the second circular buffer by decoder logic of the media playback system, the compressed bit stream may be decoded using one or more decoding algorithms to generate one or more raw video and audio data streams, and the one or more raw video and audio data streams may be sent to a third circular buffer in the reserved portion of system memory in some embodiments. For example, decoder 224 may be operative to retrieve the compressed bit stream from circular buffer 234, decode the compressed bit stream to generate raw video and audio data streams, and send the raw video and audio data streams to circular buffer 236 of reserved system memory 212.

In various embodiments, the one or more raw video and audio data streams may be retrieved from the third circular buffer by post-processor logic of the media playback system, one or more of noise reduction or picture scaling may be performed on the one or more raw video and audio data streams to generate one or more multimedia streams, and the one or more multimedia streams may be outputted. For example, post-processor logic 226 may be operative to retrieve the raw video and data streams from circular buffer 236, perform post-processing activities on the raw video and audio data streams, and output the processed multimedia streams as playback at 240. In some embodiments, the playback may comprise, for example, HD video and audio streams such as a video advertisement. Other embodiments are described and claimed.

Figure 5:
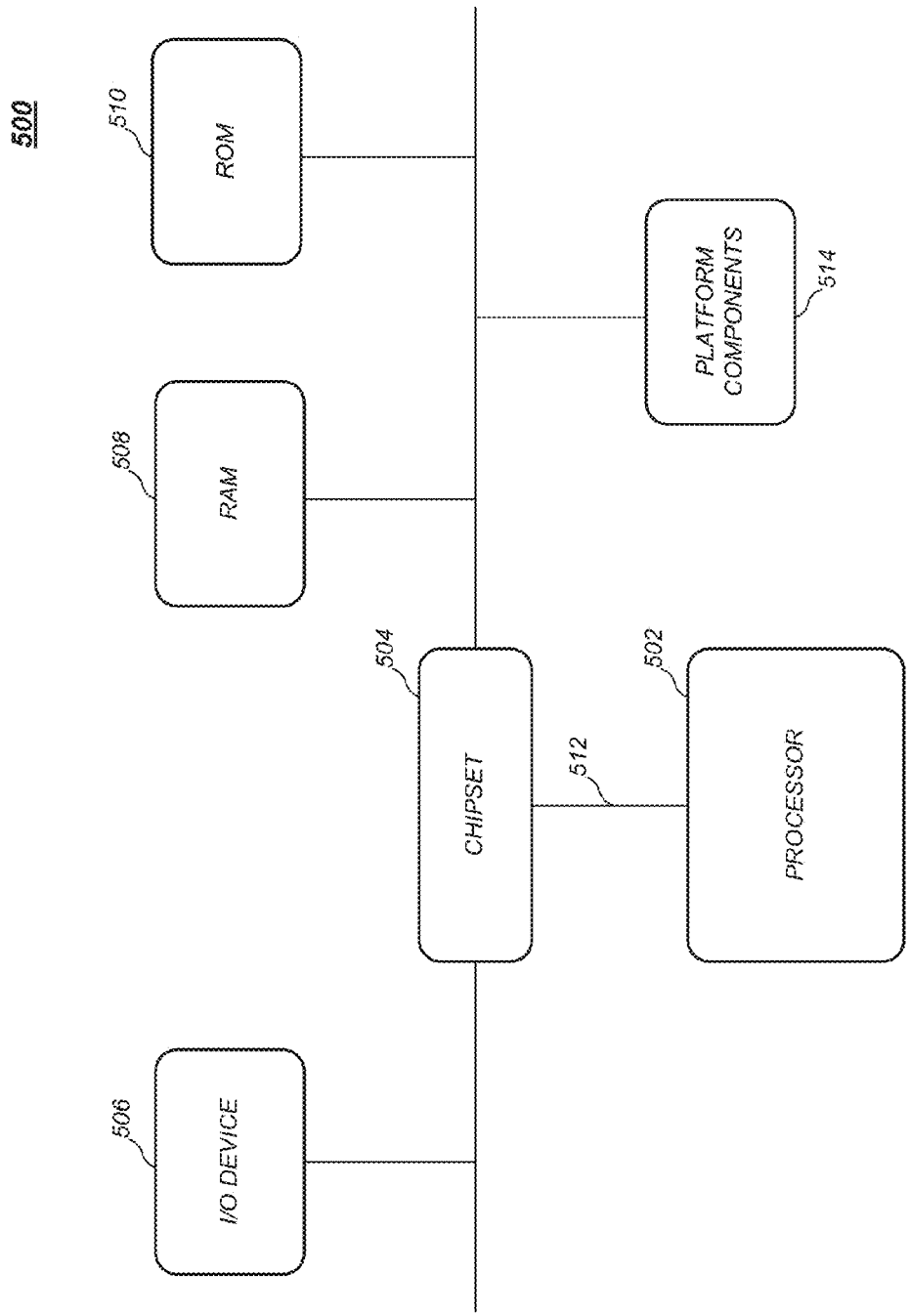
FIG. 5 illustrates one embodiment of a first system.

FIG. 5 is a diagram of an exemplary system embodiment. In particular, FIG. 5 is a diagram showing a system 500, which may include various elements. For instance, FIG. 5 shows that system 500 may include a processor 502, a chipset 504, an input/output (I/O) device 506, a random access memory (RAM) (such as dynamic RAM (DRAM)) 508, and a read only memory (ROM) 510, and various platform components 514 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 5, I/O device 506, RAM 508, and ROM 510 are coupled to processor 502 by way of chipset 504. Chipset 504 may be coupled to processor 502 by a bus 512. Accordingly, bus 512 may include multiple lines.

Processor 502 may be a central processing unit comprising one or more processor cores and may include any number of processors having any number of processor cores. The processor 502 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 500 may include various interface circuits, such as an Ethernet interface and/or a Universal Serial Bus (USB) interface, and/or the like. In some exemplary embodiments, the I/O device 506 may comprise one or more input devices connected to interface circuits for entering data and commands into the system 500. For example, the input devices may include a keyboard, mouse, touch screen, track pad, track ball, isopoint, a voice recognition system, and/or the like. Similarly, the I/O device 506 may comprise one or more output devices connected to the interface circuits for outputting information to an operator. For example, the output devices may include one or more displays, printers, speakers, and/or other output devices, if desired. For example, one of the output devices may be a digital display. The display may be a cathode ray tube (CRTs), liquid crystal displays (LCDs), or any other type of display.

The system 500 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Figure 6:
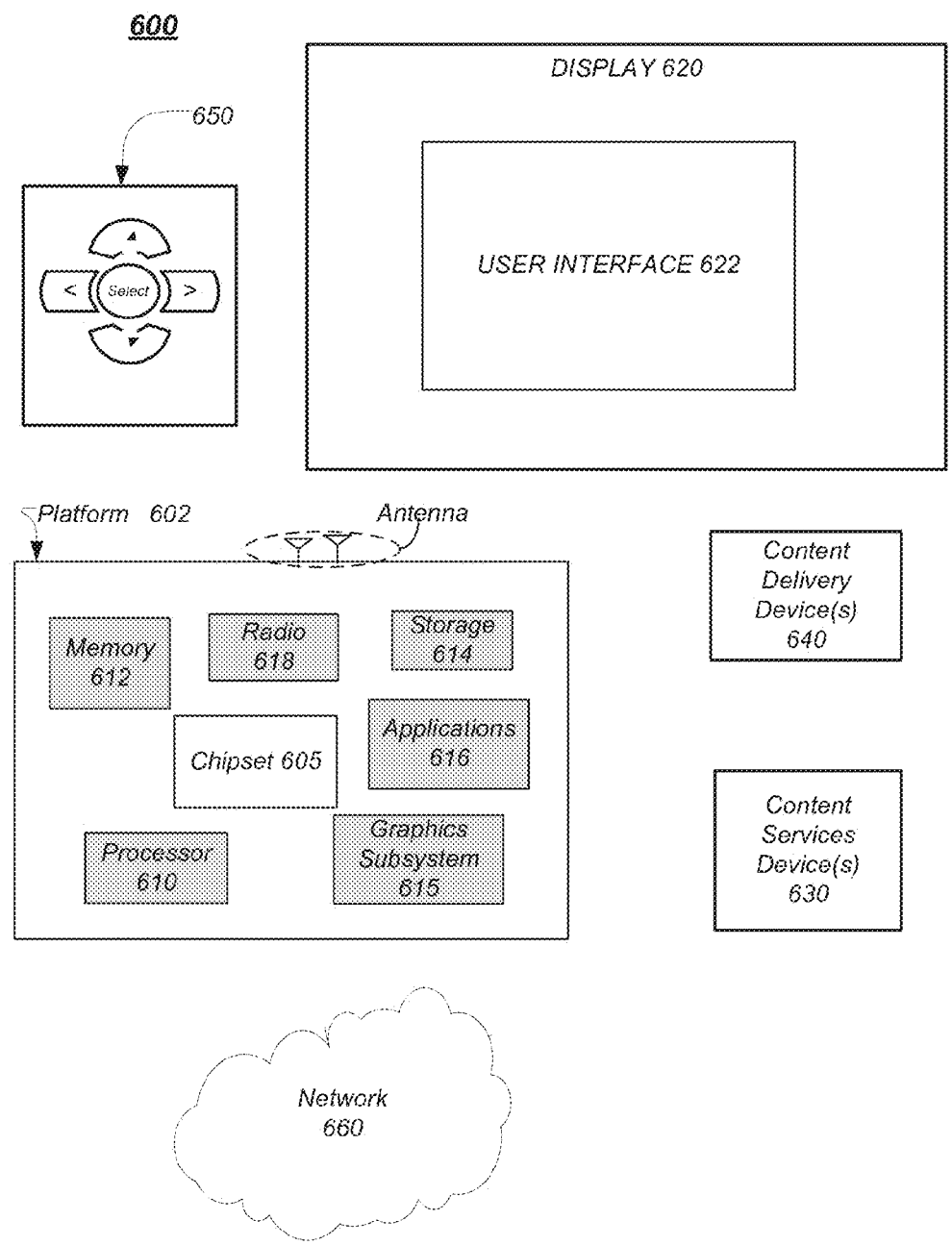
FIG. 6 illustrates one embodiment of a second system.

FIG. 6 illustrates an embodiment of a system 600. In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
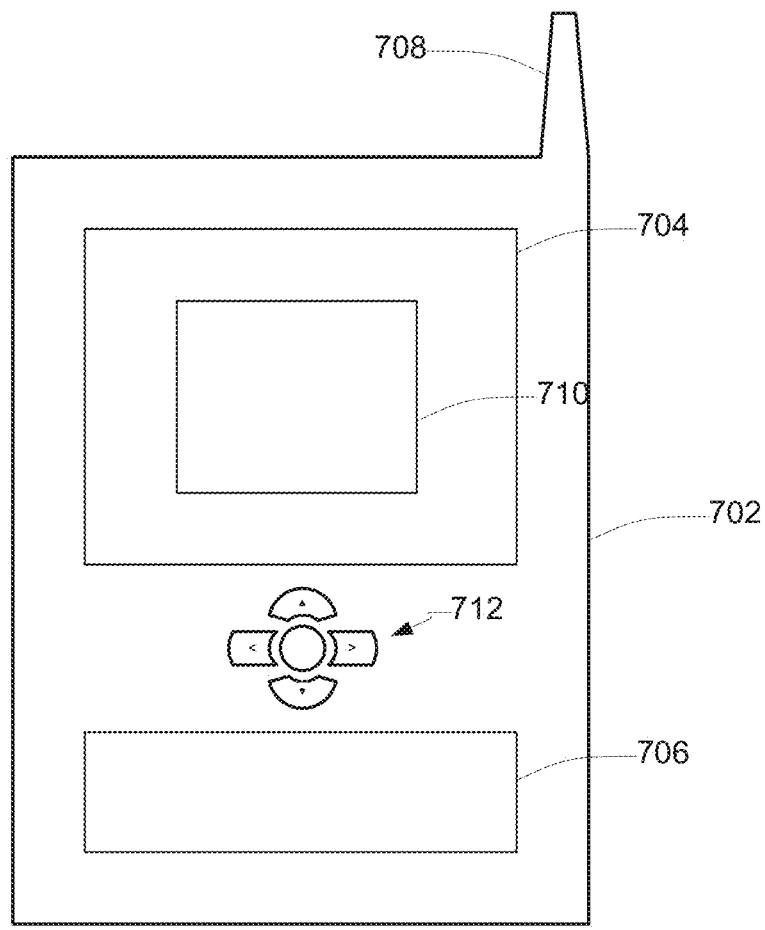
FIG. 7 illustrates one embodiments of a third apparatus.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 707. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
  initializing a computing system;
  initializing a media playback system of the computing system using a first processor circuit;
  initializing an operating system of the computing system using a second processor circuit;
  during the operating system initialization:
    receiving a program stream at demultiplexer logic of the media playback system;
    extracting video and audio streams from the program stream to form an elementary stream;
    performing error correction on the elementary stream;
    sending the elementary stream to a first circular buffer in a reserved portion of system memory;
    retrieving the elementary stream from the first circular buffer by pre-processor logic of the media playback system;
    sending a compressed bit stream to a second circular buffer in the reserved portion of system memory based on the error correction; and
    generating one or more multimedia streams based on the elementary stream;
    outputting the one or more multimedia streams using the media playback system in place of operating system graphics configured to be output by the operating system during operating system initialization.

2. The computer-implemented method of claim 1, comprising:
  determining that the operating system initialization is complete;
  interrupting the multimedia output using the second processor circuit; and
  outputting one or more graphical user interface elements of the operating system using the second processor circuit.

3. The computer-implemented method of claim 1, the one or more multimedia streams comprising high definition video and audio streams.

4. The computer-implemented method of claim 1, the first processor circuit comprising a system-on-chip (SOC) media processor circuit and the second processor circuit comprising a central processing unit (CPU).

5. The computer-implemented method of claim 1, comprising:
retrieving the compressed bit stream from the second circular buffer by decoder logic of the media playback system;
decoding the compressed bit stream using one or more decoding algorithms to generate one or more raw video and audio data streams; and
sending the one or more raw video and audio data streams to a third circular buffer in the reserved portion of system memory.

6. The computer-implemented method of claim 5, comprising:
retrieving the one or more raw video and audio data streams from the third circular buffer by post-processor logic of the media playback system;
performing one or more of noise reduction or picture scaling on the one or more raw video and audio data streams to generate one or more multimedia streams; and
outputting the one or more multimedia streams.

7. An article of manufacture comprising a non-transitory computer-readable storage medium containing instructions that if executed enable a system to:
initialize a computing system;
initialize a media playback system of the computing system using a first processor circuit;
initialize an operating system of the computing system using a second processor circuit;
receive a program stream at demultiplexer logic of the media playback system;
extract video and audio streams from the program stream to form an elementary stream;
perform error correction on the elementary stream;
send the elementary stream to a first circular buffer in a reserved portion of system memory
retrieve the elementary stream from the first circular buffer by pre-processor logic of the media playback system;
send a compressed bit stream to a second circular buffer in the reserved portion of system memory based on the error correction;
generate one or more multimedia streams based on the elementary stream; and
during the operating system initialization, output the one or more multimedia streams using the media playback system in place of operating system graphics configured to be output by the operating system during operating system initialization.

8. The article of claim 7, comprising instructions that if executed enable the system to:
determine that the operating system initialization is complete;
interrupt the multimedia output; and
output one or more graphical user interface elements of the operating system.

9. The article of claim 7, the one or more multimedia streams comprising high definition video and audio streams.

10. The article of claim 7, comprising instructions that if executed enable the system to:
retrieve the compressed bit stream from the second circular buffer by decoder logic of the media playback system;
decode the compressed bit stream using one or more decoding algorithms to generate one or more raw video and audio data streams; and
send the one or more raw video and audio data streams to a third circular buffer in the reserved portion of system memory.

11. The article of claim 10, comprising instructions that if executed enable the system to:
retrieve the one or more raw video and audio data streams from the third circular buffer by post-processor logic of the media playback system;
perform one or more of noise reduction or picture scaling on the one or more raw video and audio data streams to generate one or more multimedia streams; and
output the one or more multimedia streams.

12. An apparatus, comprising:
a first processor circuit operative to:
initialize a media playback system,
receive a program stream at demultiplexer logic of the first processor circuit;
extract video and audio streams from the program stream to form an elementary stream,
perform error correction on the elementary stream, and
generate one or more multimedia streams based on the elementary stream; and
a second processor circuit operative to initialize an operating system;
the media playback system operative to output the one or more multimedia streams during the operating system initialization in place of operating system graphics configured to be output by the operating system during operating system initialization;
the first processor circuit comprising a system-on-chip (SOC) media processor circuit and the second processor circuit comprising a central processing unit (CPU);
the SOC media processing circuit comprising the demultiplexer logic, the demultiplexer logic operative to receive the program stream from a media source, and send the elementary stream to a first circular buffer in a reserved portion of system memory;
the SOC media processing circuit comprising pre-processor logic operative to retrieve the elementary stream from the first circular buffer, and send a compressed bit stream to a second circular buffer in the reserved portion of system memory based on the error correction.

13. The apparatus of claim 12, the second processing circuit operative to determine that the operating system initialization is complete, send an interrupt to the first processing circuit to stop the multimedia stream output, and output one or more graphical user interface elements of the operating system.

14. The apparatus of claim 12, the SOC media processing circuit comprising:
decoder logic operative to retrieve the compressed bit stream from the second circular buffer, decode the compressed bit stream using one or more decoding algorithms to generate one or more raw video and audio data streams, and send the one or more raw video and audio data streams to a third circular buffer in the reserved portion of system memory.

15. The apparatus of claim 14, the SOC media processing circuit comprising:
post-processor logic operative to retrieve the one or more raw video and audio data streams from the third circular buffer, perform one or more of noise reduction or picture scaling on the one or more raw video and audio data streams to generate one or more multimedia streams, and output the one or more multimedia streams.

16. A system, comprising:
a digital display;
a system on chip (SOC) media processor circuit operative to:
   initialize a media playback system,
   receive a program stream at demultiplexer logic of the SOC media processor circuit,
   extract video and audio streams from the program stream to form an elementary stream,
   perform error correction on the elementary stream, and
   generate one or more multimedia streams based on the elementary stream;
a processor circuit operative to initialize an operating system;
the media playback system operative to output the one or more multimedia streams to the digital display during the operating system initialization in place of operating system graphics configured to be output by the operating system during operating system initialization;
demultiplexer logic operative to send the elementary stream to a first circular buffer in a reserved portion of system memory; and
pre-processor logic operative to retrieve the elementary stream from the first circular buffer, and send a compressed bit stream to a second circular buffer in the reserved portion of system memory based on the error correction.

17. The system of claim 16, the processor circuit operative to determine that the operating system initialization is complete, send an interrupt to the SOC media processing circuit to stop the multimedia stream output, and output one or more graphical user interface elements of the operating system to the digital display.

18. The system of claim 16, the SOC media processing circuit comprising:
   decoder logic operative to retrieve the compressed bit stream from the second circular buffer, decode the compressed bit stream using one or more decoding algorithms to generate one or more raw video and audio data streams, and send the one or more raw video and audio data streams to a third circular buffer in the reserved portion of system memory.

19. The system of claim 18, the SOC media processing circuit comprising:
   post-processor logic operative to retrieve the one or more raw video and audio data streams from the third circular buffer, perform one or more of noise reduction or picture scaling on the one or more raw video and audio data streams to generate one or more multimedia streams, and output the one or more multimedia streams.

20. The system of claim 16, the one or more multimedia streams comprising high definition video and audio streams.

21. The system of claim 16, the one or more multimedia streams comprising a high definition video advertisement.

* * * * *